(12) United States Patent
Lorenz et al.

(10) Patent No.: US 8,115,648 B2
(45) Date of Patent: Feb. 14, 2012

(54) SEAT OCCUPANCY SENSOR

(75) Inventors: Holger Lorenz, Bernkastel (DE); Karsten Henze, München (DE)

(73) Assignees: IEE International Electronics & Engineering S.A., Luxemburg (LU); Bayerische Motoren Werke AG (DE)

( * ) Notice: Subject to any disclaimer, the term of this patent is extended or adjusted under 35 U.S.C. 154(b) by 1050 days.

(21) Appl. No.: 10/562,596

(22) PCT Filed: Jun. 22, 2004

(86) PCT No.: PCT/EP2004/051189
§ 371 (c)(1),
(2), (4) Date: Dec. 22, 2005

(87) PCT Pub. No.: WO2005/000637
PCT Pub. Date: Jan. 6, 2005

(65) Prior Publication Data
US 2006/0150752 A1 Jul. 13, 2006

(30) Foreign Application Priority Data
Jun. 23, 2003 (EP) .................................... 03101834
Mar. 26, 2004 (DE) ......................... 10 2004 015 408

(51) Int. Cl.
*G08B 21/00* (2006.01)
(52) U.S. Cl. ......... 340/667; 340/665; 340/666; 180/271
(58) Field of Classification Search .......... 340/664–667, 340/657, 660; 180/211, 273
See application file for complete search history.

(56) References Cited

U.S. PATENT DOCUMENTS

| | | | |
|---|---|---|---|
| 4,489,302 A | | 12/1984 | Eventoff |
| 5,570,903 A | * | 11/1996 | Meister et al. ................ 280/735 |
| 5,612,876 A | | 3/1997 | Zeidler et al. |
| 5,720,277 A | | 2/1998 | Olsson et al. |
| 5,896,090 A | | 4/1999 | Okada et al. |
| 6,348,663 B1 | | 2/2002 | Schoos et al. |
| 6,429,668 B1 | | 8/2002 | Billen et al. |
| 6,450,046 B1 | | 9/2002 | Maeda |
| 6,505,521 B1 | | 1/2003 | Petri et al. |
| 7,161,460 B2 | * | 1/2007 | Federspiel ..................... 338/47 |

(Continued)

FOREIGN PATENT DOCUMENTS
DE 4110702 10/1992
(Continued)

OTHER PUBLICATIONS
International Search Report; PCT/EP2004/051189; Oct. 26, 2004.
(Continued)

*Primary Examiner* — Travis Hunnings
(74) *Attorney, Agent, or Firm* — Cantor Colburn LLP

(57) ABSTRACT

The invention relates to a seat occupancy sensor (10) comprising at least two switch elements (12, 14) which can be activated by pressure. Said elements can be associated with the surface of a seat and are arranged at a certain distance from each other in such a manner that a first switch element (12) is associated with a first area of the seat and a second switch element (14) is associated with a second area of the seat. According to the invention, the first and second switch elements (12, 14) are connected to each other in such a manner that a logical AND-linkage is produced. The first and second switch elements are, for example, serially connected in a particularly simple embodiment of the invention.

24 Claims, 3 Drawing Sheets

U.S. PATENT DOCUMENTS

2003/0023414 A1 1/2003 Lich et al.
2004/0163939 A1* 8/2004 Bieck et al. .................. 200/83 A

FOREIGN PATENT DOCUMENTS

| | | |
|---|---|---|
| DE | 4237072 | 12/1993 |
| DE | 4406897 | 5/1995 |
| DE | 19530092 | 2/1997 |
| DE | 19717273 C1 | 7/1998 |
| DE | 10047189 | 2/2002 |
| DE | 69707906 | 6/2002 |
| DE | 10143326 | 3/2003 |
| EP | 0577686 | 10/1994 |
| EP | 0873903 | 10/1998 |
| EP | 0891898 | 1/1999 |
| EP | 1050057 | 11/2000 |
| EP | 0929410 B1 | 10/2001 |
| EP | 1427611 | 6/2004 |
| EP | 1626423 A1 | 2/2006 |
| JP | 53026967 | 3/1978 |
| JP | 10214537 A2 | 8/1998 |
| JP | 11310071 A2 | 11/1999 |
| JP | 200021262 A | 1/2000 |
| JP | 2001315560 A2 | 11/2001 |
| JP | 2002063827 A | 2/2002 |
| JP | 2004145985 A | 10/2002 |
| JP | 2003011710 A2 | 1/2003 |

OTHER PUBLICATIONS

DIN 42 115—English Translation Provided.
ISBN 3-8237-6600-7—Elektrotechnik—English Translation Provided.

* cited by examiner

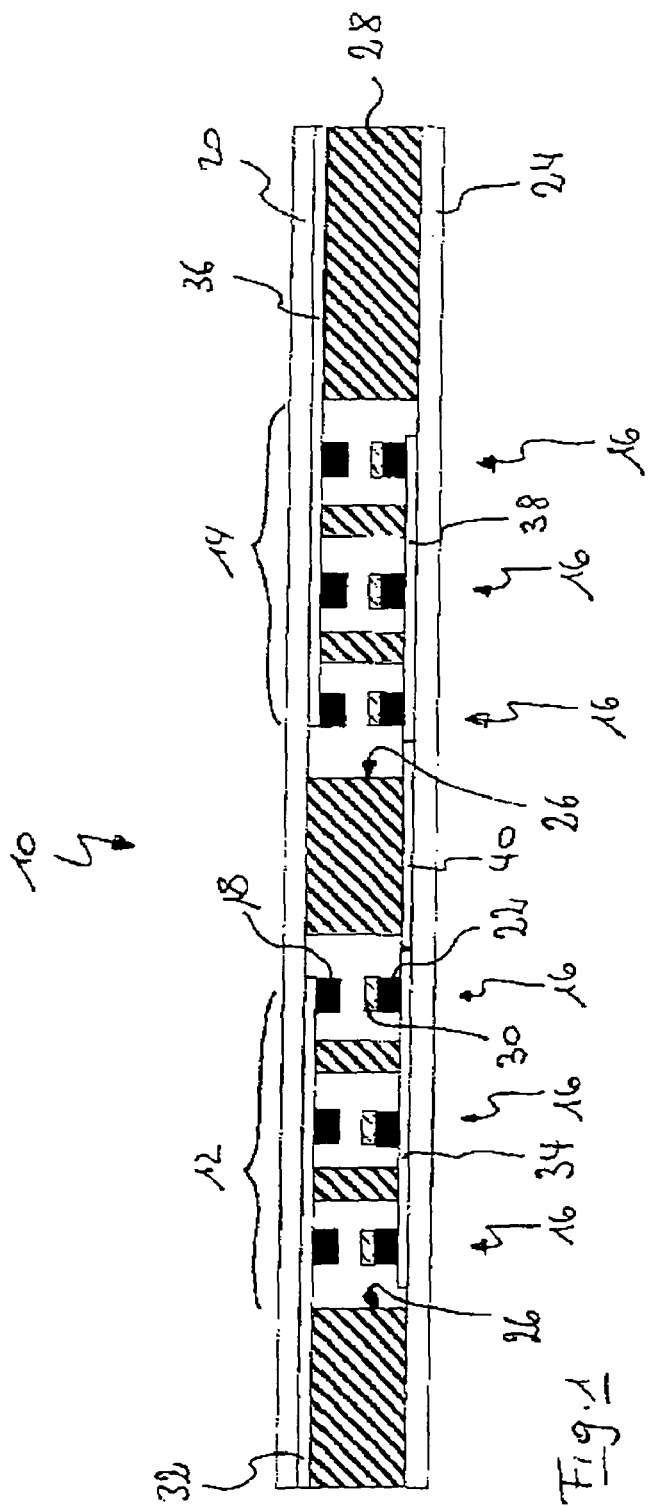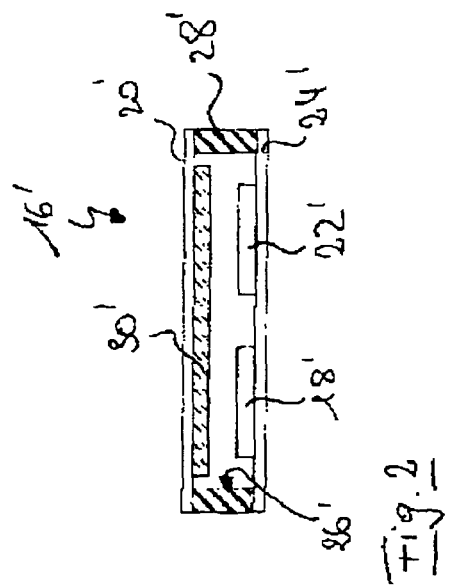

SEAT OCCUPANCY SENSOR

TECHNICAL FIELD OF THE INVENTION

The invention concerns a seat occupancy sensor, especially for use in recognition of seat occupancy in a motor vehicle.

BRIEF DESCRIPTION OF THE RELATED ART

Seat occupancy sensors have been used for some time in motor vehicles for purposes of airbag control. By means of these seat occupancy sensors, the state of occupancy of a motor vehicle seat is determined, and the airbag allocated to a given seat is only activated if the current state of occupancy of the seat warrants such activation. These seat occupancy sensors in general present a plurality of switch elements, for example pressure sensors, in an arrangement distributed in the sitting surface of the motor vehicle seat. An evaluating processor unit connected to the seat occupancy sensor queries the circuit status of each individual switch element, and from the circuit status of each of the seat occupancy sensors, determines the occupancy state of the seat. If the seat is occupied by a person, several of the switch elements will be activated by the force exerted on them by the weight of the person, and a state of occupancy of the seat will be recognized by the connected evaluating processor unit and will be relayed to the airbag control.

In principle, if the circuit status of the individual switch elements is to be queried, each of the switch elements must be connected to the evaluating processor unit. To reduce the number of connecting conductors required for this purpose, the individual switch elements are usually operated in a matrix circuit. This means that where there is a number n*m of switch elements, essentially n row conductors and m column conductors are provided, each of the switch elements being included in the circuit between one row conductor and one column conductor. It should be noted in this connection that such a matrix circuit represents a technical designation of the circuit layout. This means that the switch elements in a matrix circuit do not need to be really distributed in a regular grid arrangement, nor need the individual connection conductors be straight and parallel or at right angles to each other.

For evaluation of a sensor array in a matrix circuit, the procedure is as follows: first, the entire matrix circuit, with the exception of a first column conductor, is put on the same voltage, for example earth. A test voltage is now applied to the first column conductor, and current flowing in the individual row conductors is then selectively measured. In this way, the circuit status existing between the first column conductor and the different row conductors can be selectively determined. If this procedure is repeated for each of the column conductors, all the switch elements can be selectively evaluated in sequence.

With the seat occupancy sensor described, the occupancy situation of a seat can be determined with great precision for different zones of the motor vehicle seat, with a relatively accurate classification through the distribution of the occupancy. Such a precise classification is necessary for applications relating to safety, such as the control of the airbag allocated to the seat, in order to avoid unwanted activation of the safety system. Nevertheless, the system for occupancy recognition described above is relatively costly, both as regards the circuitry of the individual switch elements and the construction of the evaluating processor unit.

For applications not critical to safety, for which an exact assessment of seat occupancy is not essential, it is desirable to provide a less costly seat occupancy sensor. One example of such an application is the seat belt warning system that reminds a passenger taking his place in the passenger seat to fasten his seat belt. A warning system of this kind may emit an audio or visible signal, if the motor vehicle seat is occupied but the fastening of the corresponding seat belt has not been done up. The seat occupancy sensor in a system like this must basically be capable of distinguishing between seat occupancy by a passenger and occupancy by some object, such as a handbag.

For this application, a more costly classification of seat occupancy is not needed.

BRIEF SUMMARY OF THE INVENTION

The invention proposes an especially simple seat occupancy sensor that would be suitable for applications not critical for safety.

This task is fulfilled according to the invention by a seat occupancy sensor according to claim 1. This seat occupancy sensor comprises at least two switch elements actuatable by pressure that can be arranged with a certain distance between them in a surface of a seat so that a first switch element is allocated to a first area of the seat and a second switch element is allocated to a second area of the seat. According to the invention, the first and second switch elements are connected together in such a way as to form a logical AND gate. In a specially simple embodiment of the invention, the first and second switch elements are connected together, in series, for example.

The effect of connecting a minimum of two switch elements in the form of an AND gate is that a signal from the two elements can only be measured when both switch elements are actuated by a corresponding occupancy of the seat. Accordingly, with the proposed seat occupancy sensor, at least two switch elements, which are arranged in different parts of the motor vehicle seat when the sensor is installed, are connected in a circuit in such a way that occupancy of the seat is only detected as such if both switch elements are actuated by occupancy simultaneously. By this means, seat occupancy that is relevant to the seat belt warning system will only be recognized as such if the occupancy of the motor vehicle seat extends over a predetermined distance. Local actuation of the seat occupancy sensor, for example due to the presence of an object such as a handbag placed on the seat, will not be recognized as seat occupancy and the seat belt warning system will consequently not respond.

The connection in a circuit according to the invention of at least two switch elements arranged with some distance between them thus enables particularly simple detection of seat occupancy, capable of distinguishing between local and wide-area occupancy of the seat without the need for a costly matrix circuit and a costly evaluating processor unit.

It should be noted that the seat occupancy sensor may be provided with more than two switch elements. Thus three or more switch elements may be connected together to form a logical AND gate. Alternatively, several groups, each comprising two or more switch elements, may be provided.

In a particularly simple embodiment, the switch elements may take the form of simple switches, such as membrane switches, for example. In an advantageous embodiment of the invention, the first and/or second switch element comprises a pressure sensor. In this embodiment, in addition to detection of occupancy, information about the intensity of the pressure exerted can also be obtained, enabling more precise classification of the seat occupancy detected.

In a preferred embodiment of the invention, the first and/or second switch element comprises a plurality of individual switching cells, connected together in such a way that they form a logical OR gate. The individual switching cells of a switch element may be connected in parallel, for example. The effect of connecting the individual switching cells in an OR gate is that the switch element is actuated as soon as a single switching cell is actuated by a pressure load. If the individual switching cells are arranged in a cluster over a particular zone of the motor vehicle seat, this zone will constitute the active area of the corresponding switch element. Occupancy of any place within this zone will thus be recognized as occupancy of the switch element. Such a configuration of the switch elements with several individual switching cells enables the extent of the zone wherein seat occupancy can be recognized to be spatially defined.

In one possible embodiment of the seat occupancy sensor, the individual sensor cells of a switch element are arranged, for example, in a row, one behind the other. In this way, each of the switch elements presents a strip-shaped active area. The switch elements can then be arranged on or in the motor vehicle seat in such a way that the strip shaped active areas extend from a front edge to a back edge of the seat at a specific lateral distance from each other. Occupancy of the seat by a passenger, that is to say occupancy of the seat of sufficient lateral extent, can then be recognized independently of the sitting position adopted by the passenger in the longitudinal dimension of the seat. In this way, occupancy of the seat can be recognized by the pressure exerted by the bulge of the passenger's haunches irrespective of the actual size of the passenger and the individual distance between the two haunches.

In a particularly advantageous embodiment of the invention, the two switch elements are arranged at least approximately at the same distance from a line down the centre of the seat in the direction of travel of the vehicle and with a specific distance between them. By means of this symmetrical arrangement of the switch elements in relation to the centreline of the seat, occupancy of the seat that is significant for the belt warning system is only recognized as such if the occupancy of the motor vehicle seat extends over a predetermined distance and if the occupancy is at least approximately symmetrical with respect to the central plane of the seat. Localized actuation of the seat occupancy sensor, such as may result from the presence of an object such as a handbag placed on the seat, for example, will not be recognized as seat occupancy and in consequence the belt warning system will not respond.

Alternatively, the switch elements can be arranged in the seat in such a way that the first active area is positioned crossways in the front part of the seat and a second active area is positioned crossways in the rear part of the seat.

It should be noted that each individual switching cell preferably comprises a pressure sensor, so that information about the intensity of the pressure exerted can also be obtained, enabling more precise classification of the seat occupancy detected.

As sensors for the embodiments of the inventions described above, foil-type pressure sensors are particularly suitable, and foil-type pressure sensors of different types can be employed, depending on requirements. For example, it is possible to employ foil-type pressure sensors that operate in what is called through-mode, or foil-type pressure sensors that operate in what is called shunt mode.

With foil-type pressure sensors that operate in through-mode, a first contact element is located on a first supporting foil and a second contact element on a second supporting foil, the two supporting foils being with a certain distance between them and so arranged that the two contact elements are opposite each other. Between the two contact elements a layer of semiconductive material is provided which is pressed between the two contact elements when the sensor is actuated, so that the resistance between the two contact elements varies with the pressure exerted.

Shunt mode foil-type pressure sensors present two contact elements arranged with a certain distance between them on a single supporting foil. On a second supporting foil a certain distance away, a semi-conductive layer is applied, arranged in such a way that it covers the area between the two contact elements and comes into contact with both contact elements when the supporting foils are pressed together.

BRIEF DESCRIPTION OF THE DRAWINGS

An embodiment of the invention is described below with reference to figures. These show the following:

FIG. 1: Cross-section through an embodiment of the seat occupancy sensor;

FIG. 2: Cross-section through a sensor cell in shunt mode;

DETAILED DESCRIPTION OF THE INVENTION

Figure 3:
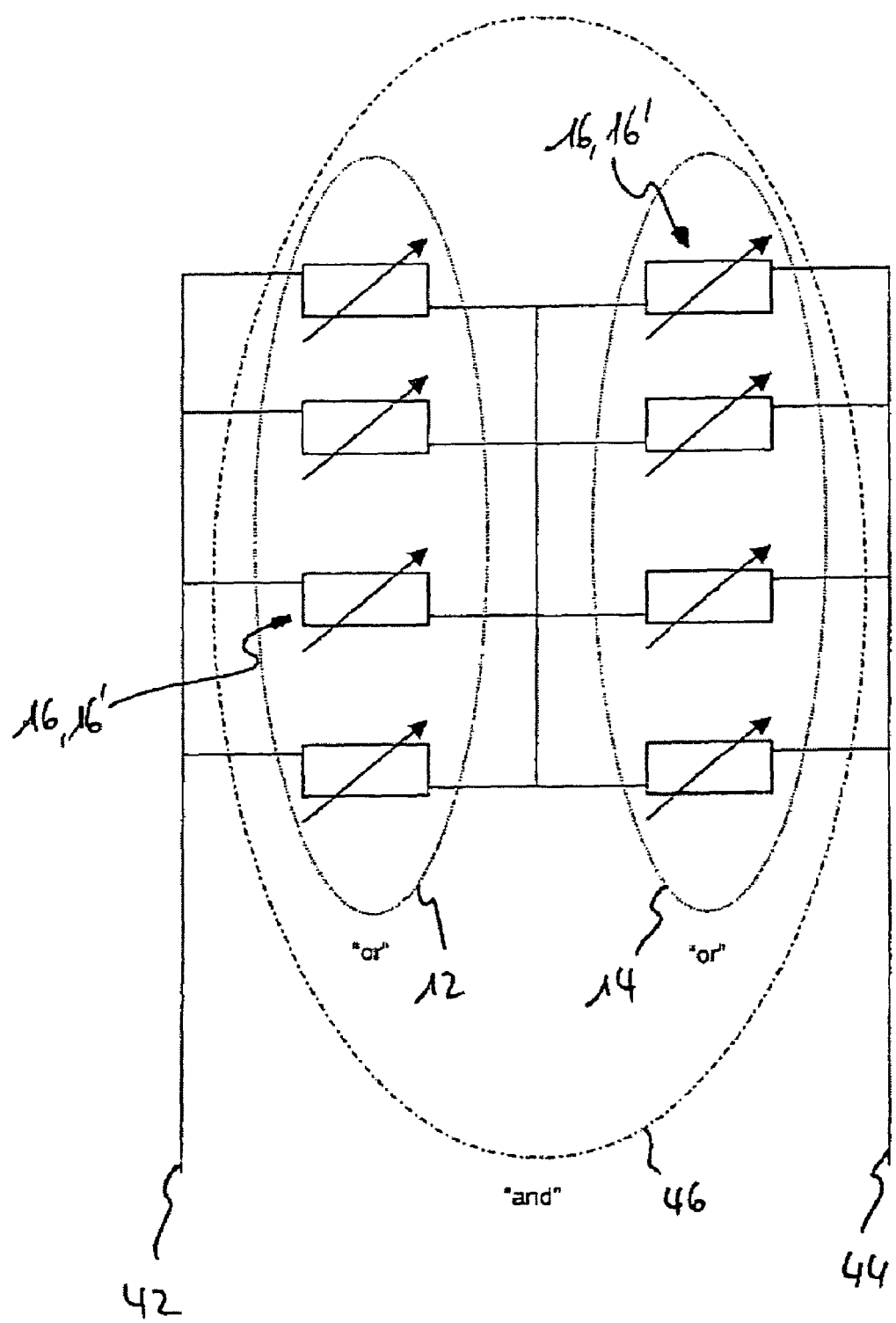
FIG. 3: Block diagram of an embodiment of a seat occupancy sensor.

A first embodiment of a seat occupancy sensor 10 is shown in cross-section in FIG. 1. This is an embodiment using foil-type pressure sensors in what is called "through-mode".

The seat occupancy sensor 10 shown comprises a first switch element 12 and a second switch element 14, each comprising a plurality of individual sensor cells 16.

Each sensor cell 16 comprises a first electrode 18 arranged on a first supporting foil 20 and a second electrode 22 arranged on a second supporting foil 24. The two supporting foils 20 and 24 are arranged by means of a spacer 28 provided with a recess 26 in such a way that the first electrode 18 and the second electrode 22 of each sensor cell 16 are positioned opposite each other and with a certain distance between them inside one of the recesses 26.

A layer 30 of some pressure-sensitive material, e.g. a suitable semi-conductive material, is applied in each sensor cell 16 to one of the electrodes, as it might be electrode 22, so that when the two supporting foils 20 and 24 are pressed together, a pressure-dependent electrical contact is established between the two electrodes through the pressure-sensitive layer 30.

It should be noted that all the sensor cells 16 present common supporting foils 20 and 24, on which the electrodes 18 and 22 are arranged, so that the seat occupancy sensor constitutes a continuous mat.

The sensor cells 16 of a switch element 12 or 14 are connected together in such a way that a logical OR gate is formed. This means that a particular switch element produces an output signal corresponding to an actuation as soon as at least one of the sensor cells is actuated. In the embodiment shown, the logical OR gate is obtained by connecting the individual sensor cells 16 of each switch element 12 or 14 in parallel. For this purpose, the first electrodes 18 of the sensor cells 16 in the switch elements 12 are connected together, for example, through a conductor track 32, while the second electrodes 22 of the sensor cells 16 in the switch elements 12 are connected together through a conductor track 34. Similarly, the first electrodes 18 of the sensor cells 16 in the switch elements 14 are connected together through a conductor track 36, while the second electrodes 22 of the sensor cells 16 in the switch elements 14 are connected together through a conductor track 38.

The two switch elements 12 and 14 themselves are connected together in such a way as to implement a logical AND gate. The effect of such a circuit is that an output signal from the seat occupancy sensor only appears at the outputs of the seat occupancy sensor if both the switch elements 12 and 14 are actuated by pressure exerted on them. In the embodiment shown, the logical AND gate is obtained by connecting the two switch elements 12 and 14 in series. For this purpose, the conductor track 34 is connected, for example, to the conductor track 38 by means of the jumper 40, while the output signal of the seat occupancy sensor is obtained between conductor tracks 32 and 36.

In an alternative embodiment of the seat occupancy sensor 10, the switch elements 12 or 14 may be composed of foil-type pressure sensors in shunt mode, as it is called. FIG. 2 shows a cross-section through a sensor cell 16 of this type. In this embodiment, the first electrode 18' and the second electrode 22' are mounted at a certain distance from each other on one of the supporting foils 24', while the pressure-sensitive layer 30' is applied to the other supporting foil 20'. The two supporting foils are arranged at a certain distance from each other by means of a spacer 28' provided with a recess 26' in such a way that the layer 30' and the two electrodes 18' and 22' are opposite each other and with a certain distance between them, so that when the two supporting foils 20' and 24' are pressed together, the pressure-sensitive layer 30' makes contact with the two electrodes 18' and 22' (short-circuiting them) and a pressure-dependent electrical contact is established between the two electrodes through the pressure-sensitive layer 30'.

FIG. 3 shows a block circuit diagram of an embodiment of a seat occupancy sensor. In this figure, the individual sensor cells 16 or 16' are drawn as variable resistances, because the electrical resistance of the foil-type pressure sensors reduces with increasing pressure on the cell.

In the embodiment shown, each of the switch elements 12 and 14 is composed of four individual sensor cells 16 or 16', all arranged in a row one behind the other. In this way, the individual cells of the switch element 12 or 14 are connected in parallel, so that for the sensor cells, each switch element implements a logical OR gate. As regards the switch elements 12 and 14, these are connected in series between two linking conductors 42 and 44 in series, so that the result is a logical AND gate (represented by the dash-dotted line 46).

Figure 4:
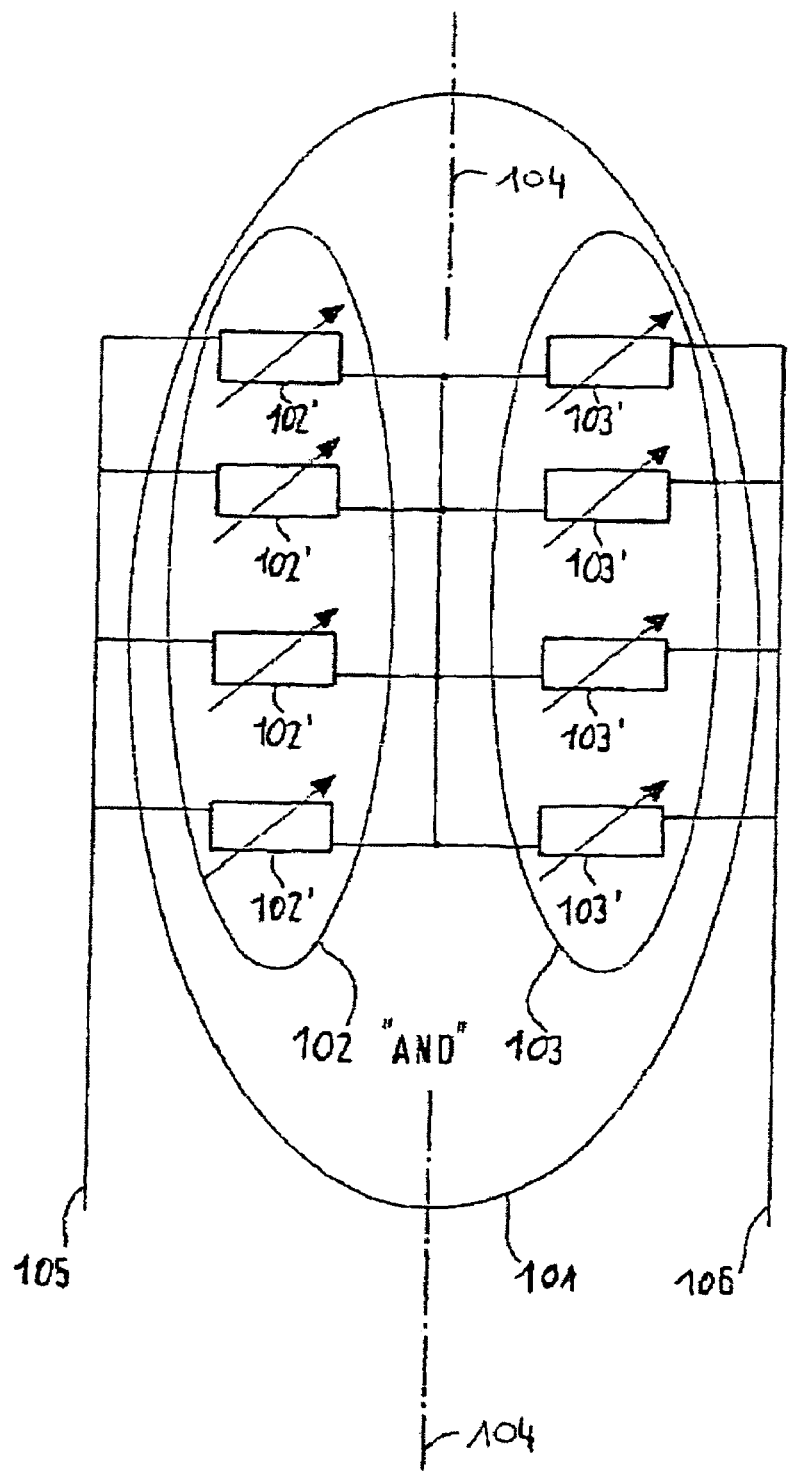
FIG. 4: Block diagram of another embodiment of a seat occupancy sensor

FIG. 4 shows a block circuit diagram of a further embodiment of a seat occupancy sensor according to the invention.

In a sitting surface 101 of a seat seen in plan view (not shown), two switch elements 102 and 103 are arranged, containing several sensor cells 102' and 103'. The cells 102' and 103'are' drawn as variable resistances. These are foil-type pressure sensors, whose electrical resistance falls with increasing pressure exerted on the cell.

Looking in the direction of travel, the switch element 102 is on the left and the switch element 103 is on the right of the centreline 104 of the seat, also running in the direction of travel. As regards the switch elements 102' and 103', as in the embodiment described above, each of these is connected in parallel, so that for the sensor cells, each switch element implements a logical OR gate. As regards the switch elements 102 and 103, these are connected between two link connectors 105 and 106 in series, so that a logical AND gate results.

When a person sits on the seat, at least one of the sensor cells is pressed and its resistance is reduced to a value close to zero. As a consequence of this alteration in resistance, the total resistance of the AND gate constituted by the two switch elements 102 and 103 also falls to a value equal to or approaching zero.

This resistance value is typical for a seated person. In contrast, when an object is lying on the seat, the resistance value is as a rule significantly greater than zero, as the weight loading is asymmetrical and/or it is not so great as in the case of a person.

By this means, it is possible to recognize a person sitting on the seat with sufficient accuracy for applications that are not critical for safety.

KEY TO REFERENCE NUMBERS

10 Seat occupancy sensor
12 Switch element
14 Switch element
16, 16' Sensor cell
18, 18' Electrode
20, 20' Supporting foil
22, 22' Electrode
24, 24' Supporting foil
26, 26' Recess
28, 28' Spacer
30, 30' Layer
32, 34, 36, 38 Conductor track
40 Jumper
42, 44 Linking conductor
46 Representation of an AND gate

The invention claimed is:

1. Seat occupancy sensor with at least two pressure actuatable switching elements, said switching elements to be associated to a surface of a seat with a certain distance between them in such a way that a first switching element is associated to a first area of the seat and a second switch element is associated to a second area of the seat, wherein said first switching element and said second switching element are connected together in such a way as to implement a logical AND operation.

2. Seat occupancy sensor according to claim 1, wherein the first and second switching elements are connected in series.

3. Seat occupancy sensor according to claim 1, wherein the first and/or second switching element comprises a pressure sensor.

4. Seat occupancy sensor according to claim 1, wherein the first and/or second switching element comprises a plurality of individual switching cells connected together in such a way as to implement a logical OR operation.

5. Seat occupancy sensor according to claim 4, wherein the individual switching cells of a switch element are connected in parallel.

6. Seat occupancy sensor according to claim 4, wherein a switching cell comprises a pressure sensor.

7. Seat occupancy sensor according to claim 3, wherein the pressure sensor comprises a foil-type pressure sensor of a "through-mode" type.

8. Seat occupancy sensor according to claim 3, wherein the pressure sensor comprises a foil-type pressure sensor of a "shunt mode" type.

9. Seat occupancy sensor according to claim 1, wherein the first and second switching elements are arranged at least approximately at equal distances from a seat centreline running longitudinally with respect to the vehicle and at a certain distance from each other.

10. Seat occupancy sensor according to claim 1, wherein the first and second switching elements are arranged essentially symmetrically with respect to a seat centreline running longitudinally with respect to the vehicle and at a predetermined distance from each other.

11. Seat occupancy sensor according to claim 6, wherein the pressure sensor comprises a foil-type pressure sensor of a "through-mode" type.

12. Seat occupancy sensor according to claim 6, wherein the pressure sensor presents a foil-type pressure sensor of a "shunt mode" type.

13. Seat occupancy sensor comprising at least two pressure actuatable switching elements, said switching elements to be integrated into a vehicle seat and associated to a seating surface of said vehicle seat with a certain distance between them in such a way that a first switching element is associated to a first area of the seat and a second switch element is associated to a second area of the seat, said first switching element and said second switching element being connected together in such a way as to implement a logical AND operation.

14. Seat occupancy sensor according to claim 13, wherein the first and second switching elements are connected in series.

15. Seat occupancy sensor according to claim 13, wherein the first and/or second switching element comprises a pressure sensor.

16. Seat occupancy sensor according to claim 13, wherein the first and/or second switching element comprises a plurality of individual switching cells connected together in such a way as to implement a logical OR operation.

17. Seat occupancy sensor according to claim 16, wherein the individual switching cells of a switch element are connected in parallel.

18. Seat occupancy sensor according to claim 16, wherein a switching cell comprises a pressure sensor.

19. Seat occupancy sensor according to claim 15, wherein the pressure sensor comprises a foil-type pressure sensor of a "through-mode" type.

20. Seat occupancy sensor according to claim 15, wherein the pressure sensor comprises a foil-type pressure sensor of a "shunt mode" type.

21. Seat occupancy sensor according to claim 13, wherein the first and second switching elements are arranged at least approximately at equal distances from a seat centreline running longitudinally with respect to the vehicle and at a certain distance from each other.

22. Seat occupancy sensor according to claim 13, wherein the first and second switching elements are arranged essentially symmetrically with respect to a seat centreline running longitudinally with respect to the vehicle and at a predetermined distance from each other.

23. Seat occupancy sensor according to claim 18, wherein the pressure sensor comprises a foil-type pressure sensor of a "through-mode" type.

24. Seat occupancy sensor according to claim 18, wherein the pressure sensor presents a foil-type pressure sensor of a "shunt mode" type.

* * * * *